United States Patent
Katagiri et al.

(10) Patent No.: US 8,037,346 B2
(45) Date of Patent: Oct. 11, 2011

(54) AVOIDING A PART OF TAPE WHERE ERROR OCCURS BY COMPUTING A NUMBER OF RECORDS AND A NUMBER OF BOUNDARY MARKS INCLUDED IN AN ERROR DATA UNIT

(75) Inventors: Takashi Katagiri, Yokohama (JP); Eiji Tosaka, Kita-ku (JP); Katsumi Yoshimura, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/189,593

(22) Filed: Aug. 11, 2008

(65) Prior Publication Data
US 2008/0294954 A1    Nov. 27, 2008

(30) Foreign Application Priority Data

Mar. 3, 2006 (JP) .................................. 2006/057444
Mar. 2, 2007 (WO) .................. PCT/JP2007/054069

(51) Int. Cl.
*G06F 11/00* (2006.01)
(52) U.S. Cl. ........................ 714/6.13; 714/771
(58) Field of Classification Search ................... 714/771
See application file for complete search history.

(56) References Cited

U.S. PATENT DOCUMENTS

| | | | | |
|---|---|---|---|---|
| 4,255,807 A | * | 3/1981 | Cosby | 714/718 |
| 4,549,295 A | * | 10/1985 | Purvis | 714/48 |
| 5,163,136 A | | 11/1992 | Richmond | 395/275 |
| 5,331,476 A | * | 7/1994 | Fry et al. | 360/53 |
| 6,378,007 B1 | | 4/2002 | Southwell | 710/1 |
| 7,443,624 B2 | * | 10/2008 | Itagaki | 360/53 |

(Continued)

FOREIGN PATENT DOCUMENTS

EP    0 724 363 A2    7/1996

(Continued)

OTHER PUBLICATIONS

"Skip of Magnetic Tape Defective Area", Nov. 1970, IBM Technical Disclosure Bulletin.*

(Continued)

*Primary Examiner* — Gabriel Chu
(74) *Attorney, Agent, or Firm* — Zilka-Kotab, PC

(57) ABSTRACT

A system for processing a data read error from a tape medium in one embodiment includes a reading section for reading data in data units from a tape medium; a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit; a computation section for computing a number of records and a number of boundary marks included in the error data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and a communication section for outputting the number information about said computed number of records and said computed number of boundary marks.

19 Claims, 6 Drawing Sheets

U.S. PATENT DOCUMENTS

| | | | |
|---|---|---|---|
| 2002/0009294 A1 | 1/2002 | Nishimura | 386/124 |
| 2004/0080849 A1* | 4/2004 | Kimura et al. | 360/53 |
| 2004/0264022 A1 | 12/2004 | Kimura | 360/31 |
| 2006/0041781 A1 | 2/2006 | Edling et al. | 714/5 |

FOREIGN PATENT DOCUMENTS

| | | |
|---|---|---|
| EP | 0 821 307 A1 | 1/1998 |
| EP | 0913762 | 5/1999 |
| EP | 0913825 | 5/1999 |
| EP | 1 158 518 A1 | 11/2001 |
| EP | 1164590 | 12/2001 |
| JP | 05-035144 A | 2/1993 |
| JP | 07-028604 | 1/1995 |
| JP | 11242855 | 9/1999 |
| JP | 2000-003310 A | 1/2000 |
| JP | 2001-357637 | 12/2001 |
| JP | 2002/251843 | 9/2002 |
| JP | 2003-257127 A | 9/2003 |
| JP | 2006/059495 | 3/2006 |
| WO | 00/75923 | 12/2000 |

OTHER PUBLICATIONS

"Data Interchange on 12, 7mm 384-Track Magnetic Tape Cartridges—Ultrium-1 Format" Standard ECMA-319, Standardizing Information and Communication Systems, Jun. 2001.

International Search Report from PCT Application No. PCT/JP2007/054069 mailed on May 29, 2007.

European Search Report from Application No. 07715163.7-1247 filed on Sep. 25, 2009.

Jaquette G A: "LTO: a better format for midrange tape" IBM Journal of Research and Development, International Business Machines Corporation, New York, NY, US., vol. 47, No. 4, Jul. 1, 2003.

Anonymous: "Licensee Section" www.lto.org, Jun. 9, 2009.

* cited by examiner

[Figure 1]
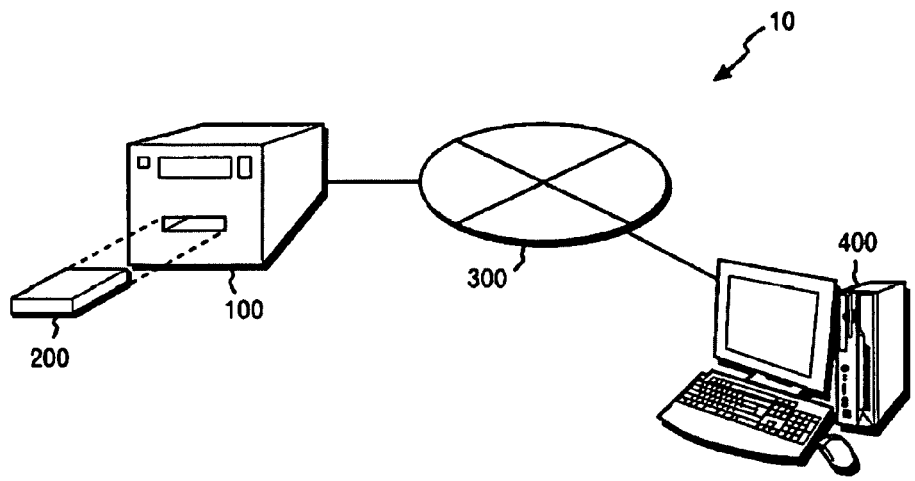
[Figure 2]
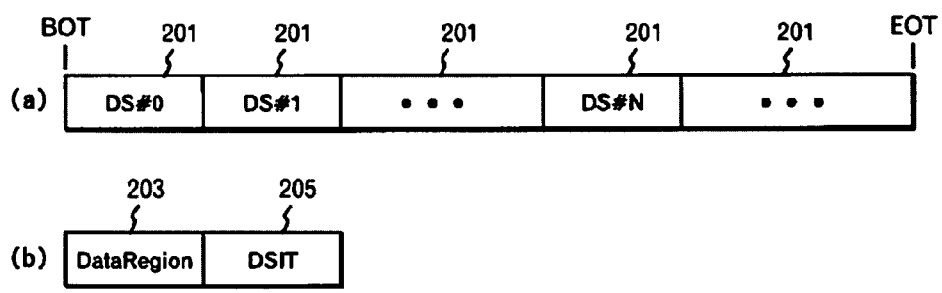
[Figure 3]
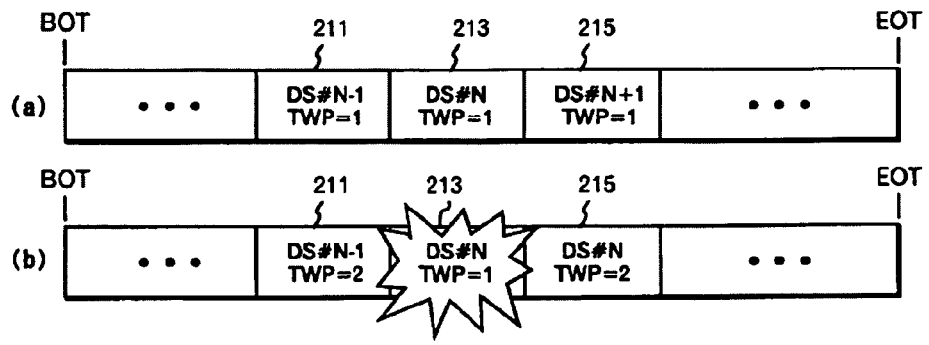

[Figure 4]
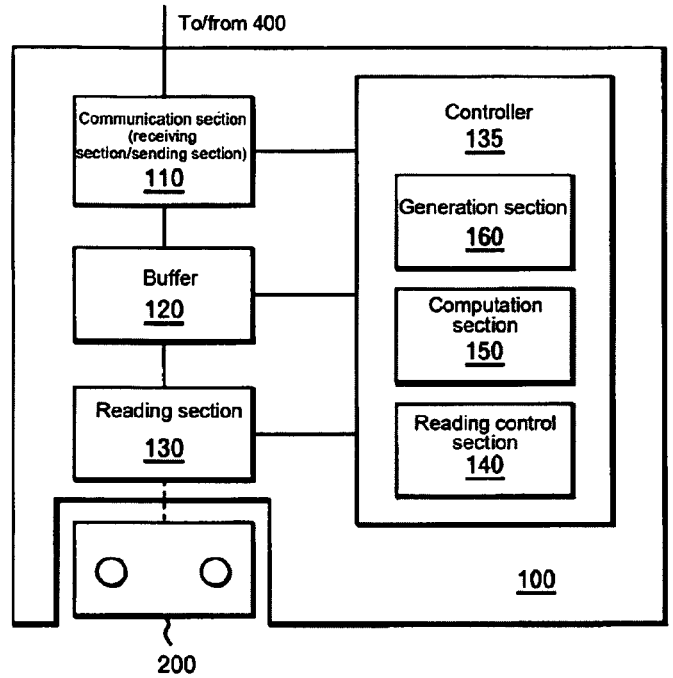
[Figure 5]
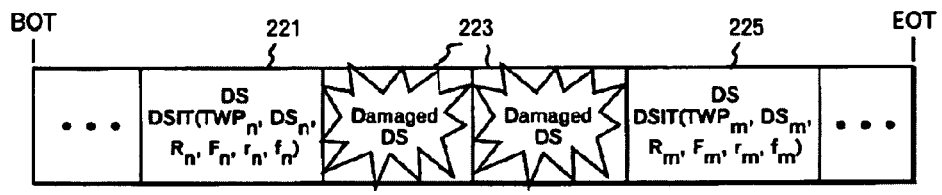
[Figure 6]
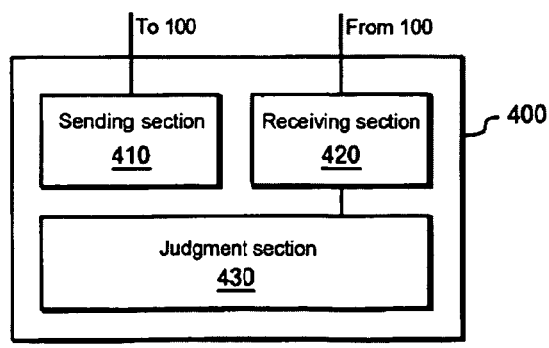

[Figure 7]
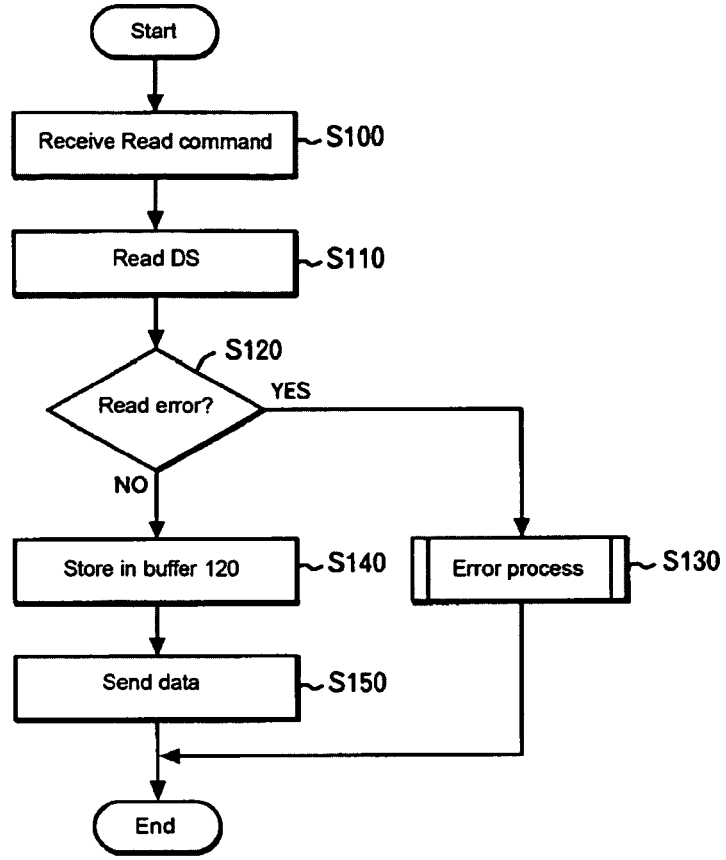
[Figure 8]
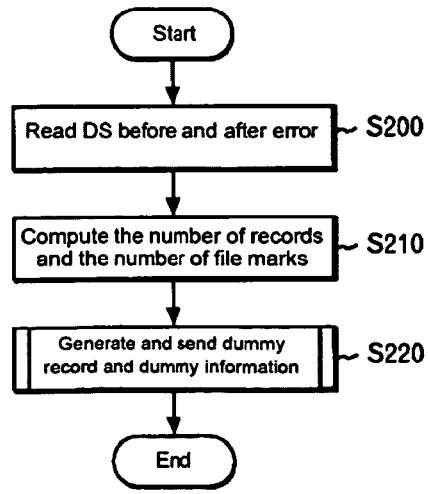

[Figure 9]
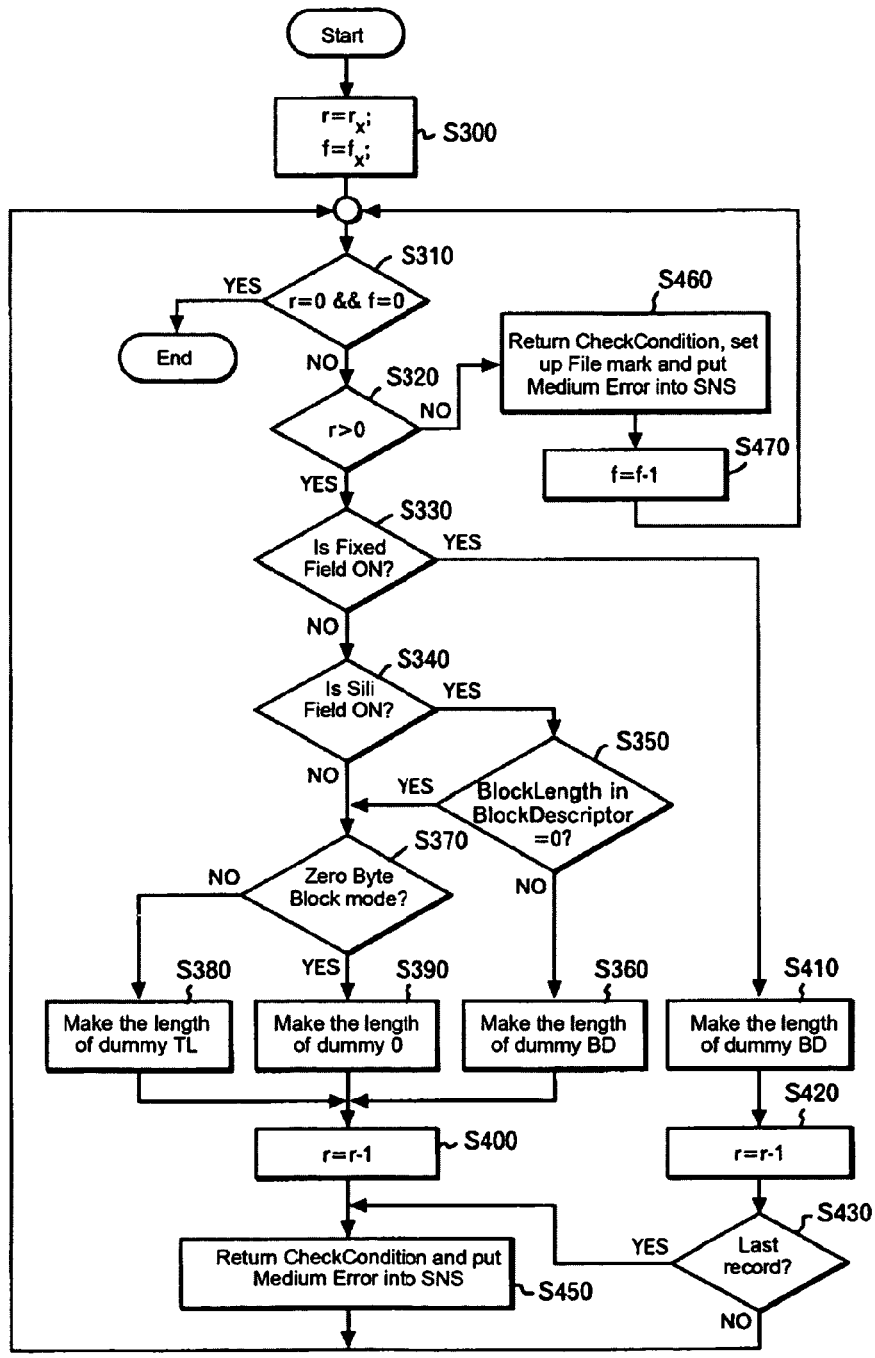

[Figure 10]
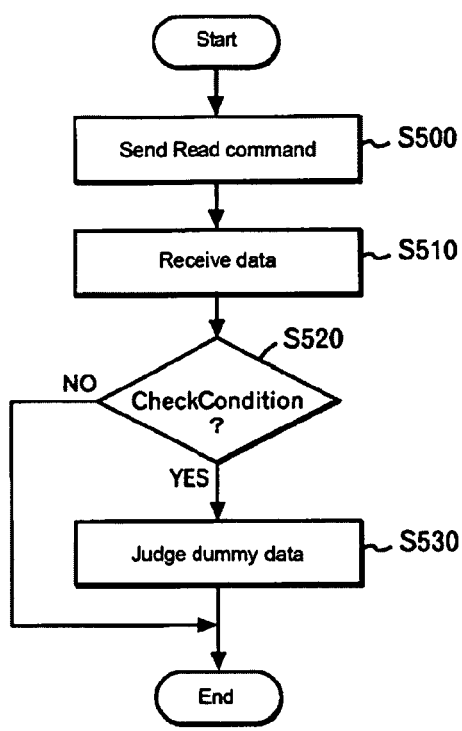

[Figure 11]
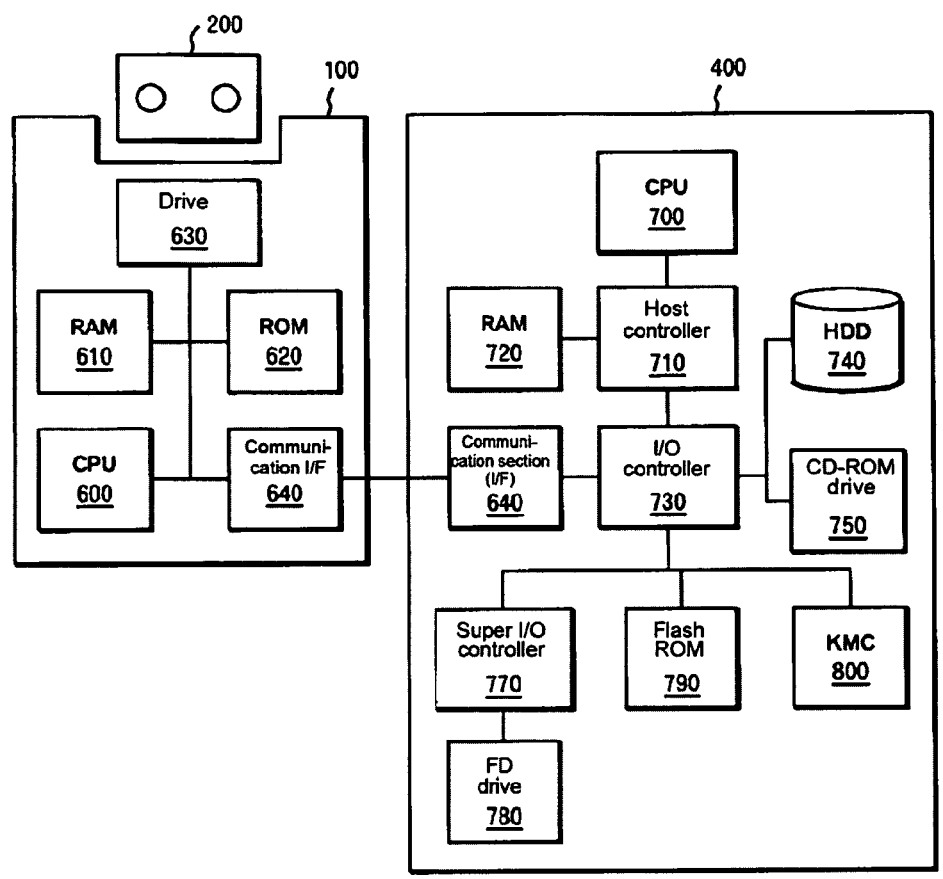

AVOIDING A PART OF TAPE WHERE ERROR OCCURS BY COMPUTING A NUMBER OF RECORDS AND A NUMBER OF BOUNDARY MARKS INCLUDED IN AN ERROR DATA UNIT

RELATED APPLICATIONS

This application claims priority from PCT Patent Application No. PCT/JP2007/054069 filed Mar. 2, 2007, and from Japanese Patent Appl. No. 2006-057444 filed Mar. 3, 2006, both of which are incorporated by reference.

BACKGROUND

The present invention relates to a technique for continuing to read data rapidly and appropriately when an unrecoverable read error occurs in a tape reader connected to a host computer.

In a tape drive for reading digital data from a magnetic tape, part of data recorded on the magnetic tape may be unreadable for some reason. When an unrecoverable read error occurs, the conventional tape drive reports the read error to the host computer, and ends reading. To continue reading data, an application of the host computer needs to avoid a part where the error occurs and read data after it.

Typically, the host computer manages the reading position of data based on how many records are in the minimum unit of data as seen from the host computer and how many format marks indicating the boundary of record block are read. On the other hand, the tape drive records data in data units differently than the host computer on the magnetic tape. Therefore, the data unit includes a plurality of records and file marks. However, the length of record is not necessarily fixed. Also, the tape drive often records data after compressing data received from the host computer. Therefore, when the data unit is unreadable for some reason, the host computer cannot know the number of records and the number of file marks included in the data.

Thus, to avoid a portion of the tape where the error occurs, the host computer needs to perform a method of 1) moving the reading position forward by small steps and trying the readability of data at every step, or 2) moving the reading position to the sufficiently far position and starting reading. However, with the method of 1), many tries are necessary, and it takes a long time to read. On the other hand, with the method of 2), data that is originally readable may be canceled.

The conventional technique for conveying the next readable data position to the host computer when an unrecoverable error occurs was described in Published Unexamined Japanese Patent Application No. 2002-251843, for example. Published Unexamined Japanese Patent Application No. 2002-251843 deals with a tape drive unit conforming to the Advanced Intelligent Tape (AIT) standards for recording or reproducing data via the tape by handling data in group units, and a host system for controlling the tape drive unit. And Published Unexamined Japanese Patent Application No. 2002-251843 discloses a technique in which the beginning of group and the beginning of sector are made coincident in allotting data in group units to sector units of the minimum processing units of the host system, and when a reproduction error occurs, the first record number of group and the error information for every frame making up the group are only returned from the tape drive unit to the host system, and the error sector can be computed on the side of the host system.

However, the technique as disclosed in Published Unexamined Japanese Patent Application No. 2002-251843 presupposes that the length of data recorded on the magnetic tape can be converted to the data length handled by the host computer. Therefore, in the case where the length of record in the minimum data unit as seen from the host computer is variable, or the tape drive compresses data from the host computer and records it in the magnetic tape, the technique of Published Unexamined Japanese Patent Application No. 2002-251843 cannot be used, whereby it is still difficult to find the next readable position in the host computer rapidly and suitably.

There is thus a need to provide a tape reader, system, method and/or program that can solve the above-mentioned problems.

SUMMARY

A system for processing a data read error from a tape medium in one embodiment includes a reading section for reading data in data units from a tape medium; a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit; a computation section for computing a number of records and a number of boundary marks included in the error data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and a communication section for outputting the number information about said computed number of records and said computed number of boundary marks.

A system for processing a data read error from a tape medium according to another embodiment includes a tape reader; and a host computer connected to said tape reader. The tape reader includes a receiving section for receiving a data reading command from said host computer; a reading section for reading data in data units from a tape medium; a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit; a computation section for computing the number of records and the number of boundary marks included in the data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and a sending section for sending the number information about said computed number of records and said computed number of boundary marks to said host computer. The host computer includes a sending section for sending said data reading command to said tape reader; a receiving section for receiving said number information; and a judgment section for judging the reading position of data based on said number information.

A method for processing a data read error from a tape medium in one embodiment includes receiving a data reading command; controlling the reading of data to read data in data units from a tape medium in accordance with said data reading command, and on condition that if an error occurs in reading said data unit, the data unit where the error occurs is considered an error data unit and the error data unit is skipped and the next readable data unit immediately after the error data unit is read; computing the number of records and the number of boundary marks included in the data unit where said error occurs from information about the records and boundary marks included in the data unit preceding the error data unit that is read immediately before said error occurs, and information about the records and boundary marks included in the data unit next to said error data unit, the boundary marks indicating the boundary of record block; and outputting the number information about said computed number of records and said computed number of boundary marks.

A method for processing a data read error from a tape medium in a system comprising a tape reader and a host computer connected to said tape reader is also presented. The method includes, in said tape reader, receiving a data reading command from said host computer; controlling the reading of data to read data in data units from a tape medium in accordance with said data reading command, and on condition that an error occurs in reading said data unit, to skip an error data unit where the error occurs and read the next readable data unit immediately after the error data unit; computing the number of records and the number of boundary marks included in the data unit where said error occurs from the information about the records and boundary marks included in the data unit preceding the error data unit that is read immediately before said error occurs, and the information about the records and boundary marks included in the data unit next to said error data unit, the boundary marks indicating the boundary of record block; and sending the number information about said computed number of records and said computed number of boundary marks to said host computer. In the host computer, the method includes sending said data reading command to said tape reader; receiving said number information; and judging the reading position of data based on said number information.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 shows one example of the configuration of a system for processing a data read error from a tape medium according to one embodiment of the present invention;

FIG. 2(a) shows one example of the organization of a recording area conforming to the LTO standards in the tape medium according to this embodiment;

FIG. 2(b) shows the organization of a dataset in an LTO data format;

FIG. 3(a) shows a state where data is firstly written into the tape medium conforming to the LTO standards;

FIG. 3(b) shows a state after data is overwritten on the tape medium as shown in FIG. 3(a);

FIG. 4 shows one example of the functional configuration of a tape reader according to this embodiment;

FIG. 5 shows a state where a read error occurs in the tape medium conforming to the LTO standards;

FIG. 6 shows one example of the functional configuration of a host computer according to this embodiment;

FIG. 7 is a flowchart showing the flow of a process for reading data in response to a Read command in the tape reader according to this embodiment;

FIG. 8 is a flowchart showing the flow of an error process in the tape reader according to this embodiment;

FIG. 9 is a flowchart showing the flow of a process for generating dummy record and sending dummy information in the tape reader according to this embodiment;

FIG. 10 is a flowchart showing the flow of a read error process in the host computer according to this embodiment; and FIG. 11 shows one example of the hardware configuration of the tape reader and the host computer 400 according to this embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A system for processing a data read error from a tape medium in one general embodiment includes a reading-section for reading data in data units from a tape medium; a reading control section for controlling the reading section to read data, and on condition that if an error occurs in reading one of the data units, the data unit where the error occurs is considered an error data unit and the reading control section issues an instruction to skip the error data unit and read the next readable data unit immediately after the error data unit; a computation section for computing a number of records and a number of boundary marks included in the error data unit where the error occurs from information about the records and boundary marks included in the data unit preceding the error data unit that is read immediately before the error occurs, and information about the records and boundary marks included in the data unit next to the error data unit, the boundary marks indicating the boundary of a record block; and a communication section for outputting the number information about the computed number of records and the computed number of boundary marks. The system may include a tape reader having one or more of the foregoing components. Moreover, a host computer may be coupled to the tape reader.

A system for processing a data read error from a tape medium in another general embodiment includes a tape reader; and a host computer connected to the tape reader. The tape reader includes a receiving section for receiving a data reading command from the host computer; a reading section for reading data in data units from a tape medium; a reading control section for controlling the reading section to read data, and on condition that if an error occurs in reading one of the data units, the data unit where the error occurs is considered an error data unit and the reading control section issues an instruction to skip the error data unit and read the next readable data unit immediately after the error data unit; a computation section for computing the number of records and the number of boundary marks included in the data unit where the error occurs from information about the records and boundary marks included in the data unit preceding the error data unit that is read immediately before the error occurs, and information about the records and boundary marks included in the data unit next to the error data unit, the boundary marks indicating the boundary of a record block; and a sending section for sending the number information about the computed number of records and the computed number of boundary marks to the host computer. The host computer includes a sending section for sending the data reading command to the tape reader; a receiving section for receiving the number information; and a judgment section for judging the reading position of data based on the number information.

A method for processing a data read error from a tape medium in yet another general embodiment includes receiving a data reading command; controlling the reading of data to read data in data units from a tape medium in accordance with the data reading command, and on condition that if an error occurs in reading the data unit, the data unit where the error occurs is considered an error data unit and the error data unit is skipped and the next readable data unit immediately after the error data unit is read; computing the number of records and the number of boundary marks included in the data unit where the error occurs from information about the records and boundary marks included in the data unit preceding the error data unit that is read immediately before the error occurs, and information about the records and boundary marks included in the data unit next to the error data unit, the boundary marks indicating the boundary of record block; and outputting the number information about the computed number of records and the computed number of boundary marks.

A method in one general embodiment for processing a data read error from a tape medium in a system comprising a tape reader and a host computer connected to the tape reader includes, in the tape reader, receiving a data reading command from the host computer; controlling the reading of data to read data in data units from a tape medium in accordance with the data reading command, and on condition that an error occurs in reading the data unit, to skip an error data unit where the error occurs and read the next readable data unit immediately after the error data unit; computing the number of records and the number of boundary marks included in the data unit where the error occurs from the information about the records and boundary marks included in the data unit preceding the error data unit that is read immediately before the error occurs, and the information about the records and boundary marks included in the data unit next to the error data unit, the boundary marks indicating the boundary of record block; and sending the number information about the computed number of records and the computed number of boundary marks to the host computer. In the host computer, the method includes sending the data reading command to the tape reader; receiving the number information; and judging the reading position of data based on the number information.

A tape reader in yet another general embodiment comprises a data reading section for reading data in every data unit of data reading unit from the tape medium, a reading control section for controlling the data reading section to read data in accordance with a command from a host computer, and on condition that an error occurs in reading the data unit, to skip an error data unit where the error occurs and read the next readable data unit immediately after the error data unit, a computation section for computing the number of records and the number of boundary marks included in the error data unit where the error occurs from the information about the records and boundary marks included in the data unit preceding the error data unit that is read immediately before the error occurs, and the information about the records and boundary marks included in the data unit next to the error data unit, the boundary marks indicating the boundary of record block, and a communication section for sending the number information about the computed number of records and the computed number of boundary marks to the host computer.

Preferably, the information about the records and boundary marks held in the data unit preceding the error data unit includes the number of records and the number of boundary marks included in the data unit preceding the error data unit and the number of records and the number of boundary marks counted from the beginning of the tape medium to the data unit preceding the error data unit. Also, the information about the records and boundary marks held in the data unit next to the error data unit includes the number of records and the number of boundary marks counted from the beginning of the tape medium to the error data unit where the error occurs.

In this case, a value of subtracting the number of records counted from the beginning of the tape medium to the data unit preceding the error data unit from the number of records counted from the beginning of the tape medium to the error data unit where the error occurs may be obtained. And if the number of records included in the data unit preceding the error data unit is further subtracted from this value, the number of records included in the error data unit where the error is detected can be obtained. The number of boundary marks can be likewise obtained.

Further, preferably, the tape medium and the tape reader conform to the Linear Tape Open (LTO) standards. The information about the records and boundary marks included in the data unit preceding the error data unit may be acquired from a Data Set Information Table (DSIT) describing the contents of data unit included in the data unit preceding the error data unit. Also, the information about the records and boundary marks included in the data unit next to the error data unit may be acquired from the DSIT included in the data unit next to the error data unit.

Also, preferably, the system further comprises a generation section for generating dummy records for the computed number of records and boundary marks for the computed number of boundary marks, wherein the communication section outputs the dummy records and the boundary marks generated as the number information, e.g., to a host computer coupled thereto.

Further, preferably, the generation section generates the dummy records with the length of read data designated in a command issued, e.g., from a host computer to a tape reader reading the data. Alternatively, the tape reader can be set a 0 byte block mode in which the length of dummy record is 0, and if the 0 byte block mode is set, the generation section generates the dummy record with the length of 0.

Also, preferably, the communication section communicates with the host computer in accordance with a Small Computer. System Interface (SCSI) protocol. The generation section may generate the dummy records by deciding the length of dummy record based on FixedBit, Suppress Incorrect Length Indicator (SILI) Bit and TransferLength included in a Read command, and BlockLength included in BlockDescriptor sent in advance from the host computer together with a ModeSelect command.

Also, preferably, the communication section sends the dummy records and the boundary marks together with the dummy information indicating that data is dummy to the host computer. Further, preferably, the communication section communicates with the host computer in accordance with the SCSI protocol. And the communication section sends CheckCondition for informing occurrence of error and SenseData with MediumError set in SenseKey for informing the content of error to the host computer.

Also, preferably, the system can be set either a normal operation mode of only returning a read error when the read error occurs, or a rescue mode of returning the number information about the number of records and the number of boundary marks included in the part where the read error occurs when the read error occurs is settable.

In a further approach, the number information about the computed number of records and the computed number of boundary marks may be output to a host computer. The host computer recognizes the data position from the number of records and the number of boundary marks received from the tape reader.

As evident from the above description, various embodiments of the present invention may be implemented by a system for processing a data read error from a tape medium, comprising a tape reader, and a host computer connected to the tape reader as follows.

Though various embodiments of the present invention have been described above as embodied by a tape reader for processing the data read error from the tape medium and a system for processing the data read error from the tape medium, the invention can be also embodied as a method, a program and/or a storage medium storing the program.

Accordingly, the length of record that the host computer writes on the tape medium is not necessarily constant, and even in the case where data is recorded on the tape medium after data compression, the host computer can estimate easily and appropriately how much data is included in the data unit on the tape medium where the read error occurs, if an unrecoverable read error occurs in reading data from the tape medium.

Illustrative embodiments of the present invention are described below in detail with reference to the drawings. The embodiments presented herein do not limit the invention as defined in the claims, and all the combinations of features as described in the embodiments may not be requisite for all embodiments of the present invention. Throughout the description of the embodiments, the same parts are designated by the same numerals.

FIG. 1 shows one example of the configuration of a system 10 for processing a data read error from a tape medium according to one embodiment of the invention. The system 10 for processing the data read error form the tape medium according to this embodiment is intended to allow a host computer 400 to estimate how much data is included in part of the tape medium 200 where an error occurs, even if the unrecoverable read error occurs when a tape reader 100 reads data from the tape medium 200 in accordance with a reading command from the host computer 400.

The system 10 for processing the read error comprises the tape reader 100 for reading data from the tape medium 200 and the host computer 400 connected to the tape reader 100. The tape reader 100 and the host computer 400 are connected via an SCSI interface or a network 300 such as a LAN (Local Area Network). Also, the tape reader 100 and the host computer 400 may be connected via a private line or the network 300 such as the Internet. The tape reader 100 may be connected to an information processing apparatus such as a personal computer via a communication interface such as the SCSI interface or the LAN, and connected to the network 300 via the information processing apparatus.

The tape reader 100 is a tape reading device conforming to the LTO (Linear Tape Open) standards, for example, and the tape medium 200 conforms to the LTO (Linear Tape Open) standards, for example. The LTO standards are the open format standards developed jointly by Hewlett-Packard Company, IBM Company and Quantum company.

The tape reader 100 reads data in every data unit that is a reading unit of data from the tape medium 200 in accordance with a data reading command from the host computer 400. When an error occurs in reading, the tape reader 100 skips reading an error data unit where the error occurs and reads the next readable data unit immediately after the error data unit. And the tape reader 100 computes how much data is included in the error data unit where the error occurs, more particularly, the number of records and the number of boundary marks indicating the boundary of record block included in the error data unit where the error occurs, from the information about the contents of data unit included in the data unit read preceding the error data unit and the information about the contents of data unit included in the data unit next to the error data unit. The record and the boundary mark are in the minimum data unit for handling as seen from the host computer 400, and in the SCSI interface, the boundary mark is called a file mark. In the following, the boundary mark is described as the file mark.

The tape reader 100 generates the dummy records for the computed number of records and the files marks for the computed number of file marks, and sends them together with the dummy information indicating that the data is dummy to the host computer 400. The host computer 400 receives the dummy records and the file marks together with the dummy information, and judges whether or not the received dummy records and file marks are dummy based on the dummy information.

In the above way, the tape reader 100 computes the number of records and the number of file marks included in the data unit (possibly plural data units) where the read error occurs from data before and after a part of the tape medium where the read error occur, and passes the information about the computed numbers to the host computer 400, whereby the host computer 400 can estimate how many records and file marks are included in the part of the tape medium 200 where the error occurs. And since the tape reader 100 sends the number information about the number of dummy records and file marks to the host computer 400 herein, the reading of data is not terminated.

FIG. 2(a) shows one example of the organization of a recording area in the tape medium 200 according to this embodiment. Herein, the tape medium 200 conforms to the LTO standards. In an LTO data format, the record and file mark received from the host computer 400 are once compressed, and then recorded on the tape medium 200 in units called a Data Set (DS) 201. The DSs 201 are numbered sequentially from the starting position of the tape medium 200, namely, Beginning Of Tape (BOT), as shown in FIG. 2(a). Also, each DS is composed of two areas, a data area 203 and a Data Set Information Table (DSIT) 205, as shown in FIG. 2(b). The data area 203 is the area for recording the data as the name implies, and the DSIT 205 describes the contents of the data area.

In the invention, to compute the number of records and the number of file marks included in the DS where the error occurs, the following information among plural pieces of information included in the DSIT 205, namely, the information including the number of DS 201 in which the DSIT 205 is included, the number of records and the number of file marks included in the DS 201, the number of records and the number of file marks included from the BOT to the immediately preceding DS 201, and a Tape Write Pass (TWP) is used. Herein, the TWP is used to judge whether or not the data is old, in which the value of TWP is 1 when data is firstly recorded, and incremented by 1 every time the data is overwritten.

Referring to FIG. 3, a method for judging whether the data is new or old based on the TWP will be described below. The data is firstly recorded from DS#N−1 211 to DS#N+1 215 on the tape medium 200, as shown in FIG. 3(a). Since any DS is firstly written on the tape medium 200, the value of the TWP indicates 1. FIG. 3(b) shows a state where data is overwritten on the tape medium 200. Seeing DS#N−1 211, the value of the TWP is incremented by 1 and equal to 2, because the data is overwritten. Then, seeing DS#N 213, the writing is disabled due to a damage on the surface of the tape medium 200. In accordance with the LTO standards, when data can not be written on the tape medium 200 for some reason, it is allowed to continue writing within four meters from a problematical part on the tape medium 200. Therefore, DS#N is overwritten at the position of DS#N+1 215 by skipping DS#N 213 where a problem occurs in FIG. 3(b). Since DS#N 215 is overwritten data, the value of the TWP is incremented by 1 and equal to 2.

Herein, if data is read from the tape medium 200 in the state of FIG. 3(b), two DSs have the same number N. Thus, the value of TWP is 1 in DS#N 213 while it is 2 in DS#N 215. Accordingly, the data of DS#N 215 having the larger value of TWP is new data. In this way, seeing the value of TWP in the LTO standards, it is possible to judge whether data is new or old. Though the tape medium 200 in the LTO standards has been described herein, the invention may be also applicable in accordance with the standards adopting a format of describing information corresponding to the information included in the DSIT for each data unit.

FIG. 4 shows one example of the functional configuration of the tape reader 100 according to this embodiment. The tape reader 100 comprises a communication section 110, a buffer 120, a reading section 130 and a controller 135. The controller 135 controls the whole of the tape reader 100, and further comprises a reading control section 140, a computation section 150, and a generation section 160. The communication section 110 communicates with the host computer 400 and may be recognized as a receiving section and a sending section. In the following, it is supposed that the communication between the tape reader 100 and the host computer 400 is performed via the SCSI interface. The communication section (receiving section) 110 receives a reading command from the host computer 400.

The reading section 130 reads data in every data or DS unit that is the data reading unit from the tape medium 200 and stores it into the buffer 120. The reading control section 140 controls the reading section 130 to read the data in accordance with a reading command from the host computer 400. When an error occurs in reading the DS, the reading control section 140 controls the reading section 130 to skip the DS where the error occurs and read and store the next readable DS immediately after the DS where the error occurs into the buffer 120. Taking the tape medium 200 as shown in FIG. 5 as an example, after the reading section 130 reads the DS 221, it skips the DS 223 (possibly plural DSs) where a read error occurs, and stores the next readable DS 225 immediately after the DS 223 into the buffer 120.

The computation section 150 reads the information about the records and file marks included in the DS 221 preceding the DS223 that is read immediately before the error occurs and the information about the records and file marks included in the DS 225 next to the DS223 from the buffer 120, and computes the number of records and the number of file marks included in the DS 223 (possibly plural DSs) where the error occurs. In the following, the computation will be described in detail.

The computation section 150 retrieves $TWP_n$, the number $DS_n$ of DS 221, the number of records $R_n$ and the number of file marks $F_n$, included from the BOT to the immediately preceding DS, and the number of records $r_n$ and the number of file marks $f_n$ included in DS 221 from the DSIT of the DS 221 preceding the DS223. Also, the computation section 150 retrieves $TWP_m$, the number $DS_m$ of DS 221, the number of records $R_m$ and the number of file marks $F_m$ included from the BOT to the immediately preceding DS from the DSIT of the DS 225 next to the DS223.

Herein, the computation section 150 firstly confirms the continuity of read data between DS 221 and DS 225 before and after the error, before computing the number of records and so on included in the DS 223 (possibly plural DSs). The discontinuity of data occurs when a write error occurs due to a damage or the like on the surface of the tape medium 200 and consequently the old data remains in overwriting the data, for example, as described above. Since such old data should be canceled, the continuity of data is firstly confirmed in the invention.

The continuity of data can be confirmed using the following four conditional expressions.

$$R_m >= R_n \qquad \text{a.}$$

$$F_m >= F_n \qquad \text{b.}$$

$$TWP_m >= TWP_n \qquad \text{c.}$$

$$DS_m > DS_n \qquad \text{d.}$$

If all the above four conditional expressions are satisfied for DS 221 and DS 225 before and after the error, it is said that DS 221 and DS 225 are continuous. If any one of the four conditional expressions is not satisfied, the computation section 150 cancels the DS 225 next to the DS223, and repeats the same check for the next DS read following the DS 225. Herein, it is supposed that the continuity of data between DS 221 and DS 225 is confirmed.

If the continuity of data is confirmed, the computation section 150 computes the number of records and the number of file marks included in the DS 223 (possibly plural DSs) where the error occurs. The following relational expression holds between the number of records $R_n$ and the number of file marks $F_n$ included from the BOT to the immediately preceding DS of the DS 221, and the number of records $r_n$ and the number of file marks $f_n$ included in DS 221.

$$R_{n+1} = R_n + r_n \qquad \text{a.}$$

$$F_{n+1} = F_n + f_n \qquad \text{b.}$$

Accordingly, the number of records $r_x$ and the number of file marks $f_x$ included in the DS 223 (possibly plural DSs) where the error occurs can be obtained from the following expressions.

$$r_x = R_m - R_n - r_m \qquad \text{a.}$$

$$f_x = F_m - F_n - f_n \qquad \text{b.}$$

If the number of records and the number of file marks are computed in accordance with the above expressions by the computation section 150, the communication section (sending section) 110 sends the number information to the host computer 400. In the tape reader 100 according to one embodiment of the invention, the communication section (sending section) 110 directly sends the computed number of records and the computed number of files marks, together with the error information, to the host computer 400. In this case, the host computer 400 needs to specify the next data reading position based on the computed number of records and the computed number of file marks to continue reading the data.

Thus, the tape reader 100 according to another embodiment of the invention further comprises a generation section 160 for generating the dummy records for the computed number of records and the file marks for the computed number of file marks not to interrupt reading the data. And the communication section (sending section) 110 sends the generated dummy records and dummy file marks as the number information to the host computer 400. In this case, the generation section 160 can generate the dummy records with the length of read data designated in an instruction sent from the host computer 400 to the tape reader 100 as the length of dummy record. Specifically, the generation section 160 decides the length of dummy record based on FixedBit, Suppress Incorrect Length Indicator (SILI) Bit and TransferLength included in the Read command sent from the host computer 400 and BlockLength included in BlockDescriptor which is sent together with a ModeSelect command ahead of the Read command from the host computer 400.

Before describing a specific method for deciding the length of dummy record, a SCSI command will be firstly described below. The ModeSelect command is the command for sending the configuration data to the tape drive before instructing the tape drive to read or write. In the ModeData sent together with the ModeSelect command, a BlockDescriptor (BD) field of 8 Bytes is defined, and the BlockLength as defined in 5 to 7 Bytes of the BD field is used as the length of logical block in a series of reading operations, for example.

Next, the Read command will be described below. In the Read command, a Suppress Incorrect Length Indicator (SIL) field is defined in Byte1 Bit1, a Fixed field is defined in Byte1 Bit0, and a TransferLength field is defined in 2 Byte to 4 Byte. When 1 is set in the Fixed field, the TransferLength field is not 0, and SILI is set to 0, then the block having the length of BlockLength is read and returned to the host computer. At this time, the value of the TransferLength field indicates the number of blocks to be returned to the host computer. On the other hand, when SILI is set to 1, the tape drive returns a CheckCondition status to the host computer.

The CheckCondition status is returned in response to the SCSI command received by the tape drive, when it is required to convey an error or warning to the host computer. Since the CheckCondition status only conveys that there is a problem, the tape drive further returns the SenseData to notify the details of error. In the SenseData, a SenseKey field is defined in 2 Byte 0 to 3 Bits, and the content of error is indicated by the SenseKey field. This SenseData can be returned to the host computer at the same time with the CheckCondition in the serial SCSI such as a FiberChannel. On the other hand, in the parallel SCSI, the SenseData can be returned in response to a Request Sense command issued from the host computer to inform the details of error.

For the Read command, when the Fixed field is set to 0, and the TransferLength field is not 0, the single block having the length of TransferLength is read. If the SILI field is set to 0, the CheckCondition status may need to be reported in accordance with the length of data that can be read or the value of BlockLength.

In the tape reader 100 according to one embodiment of the invention, the length of dummy record to be returned to the host computer 400 is estimated and decided using the SCSI command. That is, in the Read command, when 1 is set in the Fixed field, the generation section 160 has the length of BlockLength as the length of dummy record. Also, when 0 is set in the Fixed field, the generation section 160 has the length of TransferLength as the length of dummy record. However, when 0 is set in the Fixed field and 1 is set in the SILI field, the generation section 160 has the length of BlockLength as the length of dummy record as far as the BlockLength is not 0.

Herein, the estimation of record length may not rely on the tape reader 100 by newly defining a 0 byte block mode in which the length of dummy record is returned as zero. In this case, since the number of records and the number of file marks included in a part where the error occurs is sent to the host computer 400 in accordance with the normal data reading procedure, the reading of data is not interrupted, because the computed number of records and the computed number of file marks are not simply returned to the host computer 400. The 0 byte block mode can be set in the tape reader 100, using a ModeSelect command, for example.

The communication section (sending section) 110 sends the dummy records and file marks generated by the generation section 160, together with the dummy information indicating that the data is dummy, to the host computer 400. As one example, the communication section (sending section) 110 sends the CheckCondition and the SenseData to the host computer 400.

FIG. 6 shows one example of the functional configuration of the host computer 400 according to this embodiment. The host computer 400 comprises a sending section 410, a receiving section 420, and a judgment section 430. The sending section 410 sends a command for reading such as the ModeSelect command or Read command to the tape reader 100. The receiving section 420 receives the number information from the tape reader 100. And the judgment section 430 judges the tape reading position based on the number information. In the preferred embodiment, the receiving section 420 receives the dummy records and file marks as the number information together with the dummy information from the tape reader 100. And the judgment section 430 judges whether or not the records and file marks received as the number information are dummy based on the dummy information. As described above, the tape reader 100 returns the CheckCondition and the SenseData to the host computer 400, as one example. The host computer 400 knows that there occurs some problem because of receiving the CheckCondition, and investigates the SenseData to know the error content. And the host computer 400 judges that the received records and file marks are dummy if the MediumError is set in the SenseKey as dummy information.

In the above way, with the tape reader 100 according to the embodiment of the invention, if the read error occurs, the number of records and the number of file marks included in the part where the error occurs are computed and conveyed to the host computer 400, whereby the host computer 400 that manages the reading position of data based on the received number of records and the received number of file marks can correctly recognize and manage the data position. However, if the read error occurs, it may be desired to once interrupt the reading in some cases to investigate the cause of error minutely. Thus, preparing two modes, a normal operation mode of only returning the read error when the read error occurs and a rescue mode of returning the number of records and the number of file marks included in the part where the read error occurs when the read error occurs, the host computer 400 may select the mode and set it to the tape reader 100. The mode can be set using the ModeSelect command, for example.

Referring to the flowcharts of FIGS. 7 to 9, the operation of the tape reader 100 according to the embodiment will be described below. At step 100 of FIG. 7, the communication section (receiving section) 110 receives the data reading command, or the Read command, from the host computer 400. The reading section 130 reads data in DS units from the tape medium 200 in accordance with the Read command under the control of the reading control section 140 (S110). If an error occurs in reading the data (S120: YES), the process advances to step 130, where an error process is performed. On the other hand, if the DS is read without problem (S120: NO), the reading section 130 stores the read DS in the buffer 120 (S140). At the time when plural DSs are stored in the buffer 120, the communication section (sending section) 110 sends the plural DSs to the host computer 400 (S150) And the process is ended.

Referring to a flowchart of FIG. 8, the error process at step 130 will be described below. If an error occurs in reading the data, the reading control section 140 controls the reading section 130 to skip the DS where the error occurs, and read the next readable DS immediately after the DS where the error occurs (S200). The reading section 130 stores the read DS next to the DS where the error occurs in the buffer 120. The computation section 150 retrieves the information about the records and file marks included in the DS preceding the DS where the error occurs and the information about the records and file marks included in the DS next to the DS where the error occurs from the DSIT of the DS preceding the DS where the error occurs stored in the buffer 120 and the DSIT of the DS next to the DS where the error occurs, and computes the number of records and the number of file marks included in the DS (possibly plural DSs) where the error occurs (S210). The specific computation method has been described above, and is not described here to avoid repetition. Thereafter, the generation section 160 generates the dummy records for the computed number of records and the file marks for the computed number of file marks, and the communication section (sending section) 110 sends the generated dummy records and file marks together with the dummy information to the host computer 400 (S220).

Referring to a flowchart of FIG. 9, the process at step 220 will be described below. It is assumed that the number of records included in the DS where the error occurs is $r_x$ and the number of file marks is $f_x$. The process starts at step 300. First of all, the generation section 160 substitutes $r_x$ and $f_x$ as the initial values into the variables x and f. At step 310, the generation section 160 checks the values of the variables x and f, in which if both are 0, the process is ended (S310: YES). If the answer is NO at step 310, the generation section 160 further checks whether or not the value of the variable r is greater than 0. When the judgment at steps 310 and 320 is made for the first time, the process advances to the next step 330 to decide the length of dummy record, because the value of the variable r is greater than 0.

If the value of the variable r is greater than 0 (S320: YES), the generation section 160 checks the Fixed field of the Read command (S330). In the tape reader 100 according to the embodiment of the invention, if the Fixed field is not set to 1, the generation section 160 does not directly have the value of TransferLength in the Read command as the length of dummy record, but has the value of BlockLength as the length of dummy record when the SILI is set to 1 by checking the SILI field of the Read command, unless the value of BiockLength designated beforehand from the host computer 400 is 0, as described above. Thus, if the answer is NO at step 330, the generation section 160 checks the SILI of the Read command (S340). If the SILI is set to 1 (S340: YES), the generation section 160 further checks the value of BlockLength (S350), in which if not 0 (S350: NO), the value of BlockLength is made the length of dummy record (S360).

If the SILI is not set to 1 (S340: NO), or if the SILI is set to 1 but the value of BlockLength is 0 (S350: YES), the process advances to step 370, where the generation section 160 judges whether or not the 0 byte block mode of returning the length of dummy record as 0 is set. If the 0 byte block mode is not set (S370: NO), the generation section 160 makes the value of TransferLength in the Read command the length of dummy record (S380). If the 0 byte block mode is set (S370: YES), the generation section 160 makes the length of dummy record 0. And the process advances from step 360, 380 or 390 to step 400, where the generation section 160 decrements the value of variable r by 1. Also, at step 450, the communication section (sending section) 110 returns the CheckCondition for informing the read error to the host computer 400. Further, the communication section (sending section) 110 returns the SenseData with MediumError set in the SenseKey to allow the host computer 400 to identify that the sent record is the dummy record having the estimated length (S450). Thereafter, the process returns to step 310 to generate the computed number $r_x$ of dummy records repetitively.

On the other hand, if the Fixed field is set to 1 (S330: YES), the generation section 160 makes the value of BlockLength the length of dummy record (S410). And at step 420, the value of variable r is decremented by 1, and the generation section 160 judges whether or not the record is last record (S430). This is because if the Fixed field is set to 1, the reading is continuously performed, whereby the dummy information is returned only after the last record. Thus, if the record is not last record (S430: NO), the process returns to step 310 to generate the dummy record consecutively. If the record is last record (S430: YES), the process advances to step 450, the dummy information is returned to the host computer 400, as described above.

Returning to step 320, if the variable r is smaller than or equal to 0 (S320: NO), the communication section (sending section) 110 sends the file mark to the host computer 400 this time (S460). Specifically, the communication section (sending section) 110 returns the CheckCondition for informing the read error to the host computer 400, and at this time, the generation section 160 sets up a bit of the file mark in the SenseData. Also, to allow the host computer 400 to identify that the sent file mark is dummy, the communication section (sending section) 110 returns the SenseData with MediumError set in the SenseKey. Thereafter, the process returns to step 310, to return the computed number $f_x$ of dummy file marks repetitively.

Referring to a flowchart of FIG. 10, the operation of the host computer 400 according to the embodiment will be described below. At step 500 of FIG. 10, the sending section 410 of the host computer 400 sends the Read command to the tape reader 100. At step 510, the receiving section 420 receives the records and file marks as a response to the Read command from the tape reader 100. At this time, the judgment section 430 judges whether or not the CheckCondition and SenseData are sent following the records and file marks (S520). If the CheckCondition is sent (S520: YES), the judgment section 430 checks whether or not the MediumError is set in the SenseKey field of the SenseData to investigate the content of error. If the MediumError is set, the judgment section 430 judges that the received records and file marks are dummy data (S530), and the process is ended. If it is judged that the received records and file marks are dummy, the host computer 400 may simply cancel the dummy records and file marks, or may perform a process for recovering or complementing the lost data corresponding to the dummy records and file marks.

FIG. 11 on the left side shows one example of the hardware configuration of the tape reader 100 according to the embodiment. The tape reader 100 comprises a tape drive 630, a CPU 600, RAM 610, ROM 620 and a communication interface 640, which are interconnected via a bus. The tape drive 630 reads data from the tape medium 200, and provides it to the RAM 610. The ROM 620 stores a boot program that the CPU 600 executes at the time of starting the tape reader 100 and a program for operating the tape reader 100 after start-up. And the CPU 600 executes these programs using the RAM 610. A program for the tape reader for processing the data read error from the tape medium according to the invention is also stored in the ROM 620, and executed using the RAM 610 by the CPU 600. The program for the tape reader enables the tape reader 100 to function as the data reading section 130, the reading control section 140, the a computation section 150, the generation section 160 and the communication section 110. The explanation of the specific function and operation, which are the same as described using FIGS. 4, 7 and 9, is omitted.

The program provided to the tape reader 100 is read from the tape medium 200 by the tape drive 630, and installed in the tape reader 100. Alternatively, the communication interface 640 may acquire the program from the host computer 400 via an input/output device such as a serial port or a network, and install it in the tape reader 100. The program provided to the tape reader 100 is stored in the tape medium 200, a flexible disk, an optical recording medium such as CD-ROM, DVD or PD, an optical magnetic storage medium such as MD, or a semiconductor memory such as IC card, and provided by the user.

FIG. 11 on the right side shows one example of the hardware configuration of the host computer 400 according to the embodiment. The host computer 400 comprises a CPU peripheral section having a CPU 700 and a RAM 720 that are interconnected by a host controller 710, an input/output section having a communication interface 760, a hard disk drive 740, and a CD-ROM drive 750 that are connected to the host controller 710 by an input/output controller 730, and a legacy input/output section having a super I/O controller 770 connected to the input/output controller 730, and a flexible disk drive 780, a flash ROM 790 and a keyboard mouse controller 800 connected to the super I/O controller 770.

The host controller 710 connects the CPU 700 that gains access to the RAM 720 at high transfer rate to the RAM 720. The CPU 700 operates to control each section, based on a program stored in the hard disk. A program for the host computer for processing the data read error from the tape medium according to the invention is stored in the hard disk and executed using the RAM 720 by the CPU 700. The program for the host computer enables the host computer 400 to function as the sending section 410, the receiving section 420, and the judgment section 430. The explanation of the specific function and operation, which are the same as described using FIGS. 5 and 10, is omitted.

The input/output controller 730 connects the communication interface 760, the hard disk drive 740 and the CD-ROM drive 750, which are relatively high speed input/output devices, to the host controller 710. The communication interface 760 communicates with an external device such as the tape reader 100 via the network. The CD-ROM drive 750 reads the program or data from the CD-ROM, and provides it via the communication interface 760 to the tape reader 100.

Also, the relatively low speed input/output devices such as the flexible disk drive 780 and the keyboard mouse controller 800 and the flash ROM 790 are connected to the input/output controller 730. The flash ROM 790 stores a boot program executed by the CPU 700 at the time of starting the host computer 400 and a program dependent on the hardware of the host computer 400. The flexible disk drive 780 reads a program or data from a flexible disk, and provides it via the RAM 720 to the super I/O controller 770. The super I/O controller 770 connects the flexible disk and various input/output devices via a parallel port, a serial port, a keyboard port or a mouse port, for example.

Though the invention has been described above using the embodiments, the technical range of the invention is not limited to the range as described in the above embodiments. For example, in the above embodiment, the number of records and the number of file marks included in the part of the tape medium 200 where the error occurs was computed by the computation section 150 of the tape reader 100. However, the sending section 110 of the tape reader 100 may retrieve the first information about the records and the boundary marks indicating the boundary of record block included in the data unit preceding the data unit where the error occurs that is read immediately before the error occurs, and the second information about the records and boundary marks included in the data unit next to the data unit where the error occurs from the buffer 120 storing the data unit read by the reading section 130, and send them to the host computer 400. And the judgment section 430 of the host computer 400 may judge the reading position of data by computing the number of records and the number of boundary marks included in the data unit where the error occurs, based on the first information and the second information. It will be apparent to a person skilled in the art that various variations or improvements may be made to the above embodiments. Accordingly, the embodiments with such variations or improvements may be encompassed within the technical range of the invention.

The invention claimed is:

1. A system for processing a data read error from a tape medium, the system comprising:

a reading section for reading data in data units from a tape medium;

a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit;

a computation section for computing a number of records and a number of boundary marks included in the error data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and a communication section for outputting the number information about said computed number of records and said computed number of boundary marks, wherein the information about the records and boundary marks included in the data unit preceding said error data unit includes the number of records and the number of boundary marks included in the data unit preceding said error data unit and the number of records and the number of boundary marks counted from the beginning of said tape medium to the data unit preceding said error data unit, and wherein the information about the records and boundary marks included in the data unit next to said error data unit includes the number of records and the number of boundary marks counted from the beginning of said tape medium to the error data unit where said error occurs.

2. The system according to claim 1, where said tape medium and said system conform to Linear Tape Open (LTO) standards, wherein the information about the records and boundary marks included in the data unit preceding said error data unit is acquired from a Data Set Information Table (DSIT) describing the contents of a data unit included in the data unit preceding said error data unit, and wherein the information about the records and boundary marks included in the data unit next to said error data unit is acquired from the DSIT included in the data unit next to said error data unit.

3. The system according to claim 2, wherein the number information about said computed number of records and said computed number of boundary marks are output to a host computer, wherein said host computer recognizes the data position from the number of records and the number of boundary marks received from said system.

4. A system for processing a data read error from a tape medium, the system comprising:
 a reading section for reading data in data units from a tape medium;
 a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit;
 a computation section for computing a number of records and a number of boundary marks included in the error data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and
 a communication section for outputting the number information about said computed number of records and said computed number of boundary marks; and
 a generation section for generating dummy records for said computed number of records and boundary marks for said computed number of boundary marks, wherein said communication section outputs said dummy records and said boundary marks generated as the number information.

5. The system according to claim 4, wherein said generation section generates the dummy records with the length of read data designated in a command issued from a host computer.

6. The system according to claim 5, wherein said communication section communicates with said host computer in accordance with a Small Computer System Interface (SCSI) protocol, and said generation section generates the dummy records by deciding the length of dummy record based on Fixed Bit, Suppress Incorrect Length Indicator (SILO Bit and TransferLength included in a Read command, and BlockLength included in Block Descriptor sent in advance from said host computer together with a ModeSelect command.

7. The system according to claim 4, wherein said, communication section sends said dummy records and said boundary marks together with the dummy information indicating that data is dummy to a host computer.

8. The system according to claim 7, wherein said communication section communicates with said host computer in accordance with the SCSI protocol, and said communication section further sends CheckCondition for informing occurrence of error and Sensepata with MediumError set in SenseKey for informing the content of error to said host computer.

9. The system according to claim 4, wherein a 0 byte block mode in which the length of dummy record is 0 is settable.

10. The system according to claim 4, wherein the number information about said computed number of records and said computed number of boundary marks are output to a host computer, wherein said host computer recognizes the data position from the number of records and the number of boundary marks received from said system.

11. A system for processing a data read error from a tape medium, the system comprising:
 a reading, section for reading data in data units from a tape medium;
 a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit;
 a computation section for computing a number of records and a number of boundary marks included in the error data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and
 a communication section for outputting the number information about said computed number of records and said computed number of boundary marks,
 wherein either a normal operation mode of only returning a read error when the read error occurs, or a rescue mode of returning the number information about the number of records and the number of boundary marks included in the part where the read error occurs when the read error occurs, is settable.

12. The system according to claim 11, wherein the number information about said computed number of records and said computed number of boundary marks are output to a host computer, wherein said host computer recognizes the data position from the number of records and the number of boundary marks received from said system.

13. A system for processing a data read error from a tape medium, comprising:
 a tape reader; and
 a host computer connected to said tape reader;
 said reader comprising:
 a receiving section for receiving a data reading command from said host computer;
 a reading section for reading data in data units from a tape medium;
 a reading control section for controlling said reading section to read data, and on condition that if an error occurs in reading one of said data units, the data unit where the error occurs is considered an error data unit and the reading control section issues an instruction to skip the error data unit and read the next readable data unit immediately after the error data unit;
 a computation section for or computing the number of records and the number of boundary marks included in the data unit where said error occurs from information about the records and boundary marks included in the data unit preceding the error data unit that is read immediately before said error occurs, and information about the records and boundary marks included in the data unit next to said error data unit, the boundary marks indicating the boundary of a record block; and as sending section for sending the number information about said computed number of records and said computed number of boundary marks to said host computer; and said host comprising:
a sending section for sending said data reading command to said tape reader;
a receiving section for receiving said number information; and
a judgment section for judging the reading position of data based on said number information,
wherein said tape reader further comprises a generation section for generating dummy records for said computed number of records and boundary marks for said computed number of boundary marks, wherein said sending section of said tape reader sends said dummy record and said boundary mark generated as the number information together with the dummy information indicating that the data is dummy to said host computer, and said judgment section judges whether said received dummy record and said boundary mark are dummy based on said dummy information and judges the reading position of data.

14. A method for processing a data read error from a tape medium, the method comprising:
receiving a data reading command;
controlling the reading of data to read data in data units from a tape medium in accordance with said data reading command, and on condition that if an error occurs in reading said data unit, the data unit where the error occurs is considered an error data unit and the error data unit is skipped and the next readable data unit immediately after the error data unit is read;
computing the number of records and the number of boundary marks included in the data unit where said error occurs from information about a number of records and boundary marks from a beginning of said tape medium to the error data unit and a number of records and boundary marks from the beginning, of said tape medium to the end of the error data unit; and
outputting the number information about said computed number of records and said computed number of boundary marks.

15. The method according, to claim 14, wherein either a normal operation mode of only returning a read error when the read error occurs, or a rescue mode of returning the number information about the number of records and the number of boundary marks included in the part where the read error occurs when the read error occurs is settable.

16. A method for processing a data read error from a tape medium in a system comprising a tape reader and a host computer connected to said tape reader, the method comprising:
receiving a data reading command from said host computer;
controlling the reading of data to read data in data units from a tape medium in accordance with said data reading command, and on condition that an error occurs in reading said data unit, to skip an error data unit where the error occurs and read the next readable data unit immediately after the error data unit;
computing the number of records and the number of boundary marks included in the data unit where said error occurs from the information about the records and boundary marks included in the data unit preceding the error data unit that is read immediately before said error occurs, and the information about the records and boundary marks included in the data unit next to said error data unit the boundary marks indicating the boundary of record block;
sending the number information about said computed number of records and said computed number of boundary marks to said host computer; and
in said tape reader, a step of generating dummy records for said computed number of records and boundary marks for said computed number of boundary marks, wherein said sending step in said tape reader comprises a step of sending said dummy record and said boundary mark generated as the number information together with the dummy information indicating that the data is dummy to said host computer, and said judgment step comprises a step of judging whether said received dummy record and said boundary mark are dummy based on said dummy information and judges the reading position of data.

17. A method for processing a data read error from a tape medium in a system comprising a tape reader and a host computer connected to said tape reader, the method comprising:
receiving a data reading command firm said host computer;
controlling the reading of data to read data in data units from a tape medium in accordance with said data reading command, and on condition that an error occurs in reading said data unit, to skip an error data unit where the error occurs and read the next readable data unit immediately after the error data unit;
computing the number of records and the number of boundary marks included in the data unit where said error occurs from the information about the records and boundary marks included in the data unit preceding the error data unit that is read immediately before said error occurs, and the information about the records and boundary marks included in the data unit next to said error data unit, the boundary marks indicating the boundary of record block;
sending the number information about said computed number of records and said computed number of boundary marks to said host computer,
wherein either a normal operation mode of only returning a read error when the read error occurs, or a rescue mode of returning the number information about the number of records and the number of boundary marks included in the pan where the read error occurs when the read error occurs is settable.

18. A system for processing a data read error from a tape medium, comprising:
a tape reader; and
a host computer connected to said tape reader;
said tape reader comprising:
receiving section for receiving a data reading command from said host computer;
a reading section for reading data in data units from a tape medium;
a reading control section for controlling said reading section to read data, and on condition that if an error occurs in reading one of said data units, the data unit where the error occurs is considered an error data unit and the reading control section issues an instruction to ski the error data unit and read the next readable data unit immediately after the error data unit;
a computation section for computing the number of records and the number of boundary marks included in the data unit where said error occurs from information about the records and boundary marks included in the data unit preceding the error data unit that is read immediately before said error occurs, and information about the records and boundary marks included in the data unit next to said error data unit the boundary marks indicating the boundary of a record block; and
a sending section for sending the number information about said computed number of records and said computed number of boundary marks to said host computer; and
said host computer comprising:
   a sending section for sending said data reading command to said tape reader;
   a receiving section for receiving said number information; and
   a judgement section for judging the reading position of data based on said number information,
wherein either a normal operation mode of only returning a read error when the read error occurs, or a rescue mode of returning the number information about the number of records and the number of boundary marks included in the part where the read error occurs when the read error occurs is settable.

19. A system for processing a data read error from a tape medium, the system comprising:

a reading section for reading data in data units from a tape medium;
a reading control section for controlling said reading section to read data, and on condition that an error occurs in reading one of said data units, the data unit where the error occurs is considered an error data unit and the reading control section issues an instruction to ski the error data unit and read the next readable data unit immediately after the error data unit;
a computation section for computing a number of records and a number of boundary marks included in the error data unit where said error occurs from information about the records and boundary marks included in the data unit preceding the error data unit that is read immediately before said error occurs, and information about the records and boundary narks included in the data unit next to said error data unit, the boundary marks indicating the boundary of a record block; and
a communication section for outputting the number information about said computed number of records and said computed number of boundary marks,
wherein the number of records and the number of boundary marks included in the data unit where said error occurs is computed from information about a number of records and boundary marks from a beginning of said tape medium to the error data unit and a number of records and boundary marks from the beginning of said tape medium to the end of the error data unit.

* * * * *